United States Patent
Kuze (10) Patent No.: US 8,744,719 B2
(45) Date of Patent: Jun. 3, 2014

(54) VEHICLE RUNNING CONTROL DEVICE

(75) Inventor: Yasuhiro Kuze, Numazu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 184 days.

(21) Appl. No.: 13/144,236

(22) PCT Filed: Mar. 9, 2009

(86) PCT No.: PCT/JP2009/054432
§ 371 (c)(1),
(2), (4) Date: Jul. 12, 2011

(87) PCT Pub. No.: WO2010/103604
PCT Pub. Date: Sep. 16, 2010

(65) Prior Publication Data
US 2011/0276246 A1   Nov. 10, 2011

(51) Int. Cl.
*B60T 7/12* (2006.01)
(52) U.S. Cl.
USPC .......................................................... 701/96
(58) Field of Classification Search
CPC ............... B06T 7/12; B06T 8/32; G05D 1/00; G05D 1/02; G08D 1/16
USPC ........................ 701/96, 70, 91, 93, 300, 301
See application file for complete search history.

(56) References Cited

U.S. PATENT DOCUMENTS

| 2004/0093145 A1 | 5/2004 | Tanimichi et al. |
| 2005/0167175 A1 | 8/2005 | Isaji et al. |
| 2006/0100769 A1* | 5/2006 | Arai et al. ................. 701/96 |
| 2008/0255746 A1 | 10/2008 | Hellmann et al. |

FOREIGN PATENT DOCUMENTS

| JP | 60 215432 | 10/1985 |
| JP | H8-017000 | 1/1996 |
| JP | H10-318009 | 12/1998 |
| JP | 2001 26226 | 1/2001 |
| JP | 2002 500980 | 1/2002 |
| JP | 2004 175350 | 6/2004 |
| JP | 2005 212747 | 8/2005 |
| JP | 2008-514494 | 5/2008 |

OTHER PUBLICATIONS

International Preliminary Report on Patentability and Written Opinion issued Oct. 27, 2011, in PCTJP2009/054432.
International Search Report issued Jun. 16, 2009 in PCT/JP09/54432 filed Mar. 9, 2009.

* cited by examiner

*Primary Examiner* — Kim T Nguyen
(74) *Attorney, Agent, or Firm* — Oblon, Spivak, McClelland, Maier & Neustadt, L.L.P.

(57) ABSTRACT

Disclosed is a vehicle running control device that controls the speed of a vehicle on the basis of the information of a set inter-vehicle distance or a set vehicle speed according to the detection state of a vehicle in front. When an accelerator pedal or a brake pedal of the vehicle is operated and the vehicle in front of the vehicle is present, the set inter-vehicle distance is updated. When the pedal of the vehicle is operated and the vehicle in front of the vehicle is absent, the set vehicle speed is updated.

6 Claims, 7 Drawing Sheets

VEHICLE RUNNING CONTROL DEVICE

TECHNICAL FIELD

The present invention relates to a vehicle running control device that controls the speed of a vehicle on the basis of the information of a set inter-vehicle distance or a set vehicle speed according to the detection state of a forward vehicle.

BACKGROUND ART

In recent years, a vehicle running control device disclosed in Patent Literature 1 has been known as a technique of this field. In the device disclosed in the following Patent Literature 1, a vehicle speed, which is a standard for vehicle running control, is set and the set vehicle speed is changed depending on the amount of operation of an accelerator pedal of the vehicle.
[Patent Literature 1] PCT Japanese Translation Patent Publication No. 2002-500980

SUMMARY OF INVENTION

Technical Problem

However, when a set vehicle speed and a set inter-vehicle distance are used as the standard for vehicle running control, the vehicle running control device can change only the set vehicle speed according to the amount of operation of the accelerator pedal. However, when the driver wants to change the set inter-vehicle distance, the driver needs to perform operations (for example, a lever operation or a button operation) other than the pedal operation. Therefore, the driver needs to perform a complicated operation so that the user convenience is insufficient. In the setting of information in the vehicle running control, an HMI (Human Machine Interface) that enables the driver to intuitively set information needs to be constructed.

An object of the invention is to provide a vehicle running control device that enables the driver to intuitively set the information for the vehicle running control.

Solution to Problem

According to an aspect of the invention, there is provided a vehicle running control device that controls the speed of a vehicle on the basis of information of a set inter-vehicle distance or a set vehicle speed according to the detection state of a vehicle in front. When an accelerator pedal or a brake pedal of the vehicle is operated and the vehicle in front of the vehicle is present, the set inter-vehicle distance is updated. When the pedal of the vehicle is operated and the vehicle in front of the vehicle is absent, the set vehicle speed is updated.

In the vehicle running control device, as information used to control the speed of the vehicle, an inter-vehicle distance and a vehicle speed are set in advance. When the accelerator pedal or the brake pedal of the vehicle is operated and the vehicle in front of the vehicle is present, it is considered that the driver wants to change the distance between the vehicle in front and the vehicle and operates the pedal. Therefore, in this case, the set inter-vehicle distance is updated, and it is possible to perform the setting process according to the sense of the driver. When the pedal of the vehicle is operated and the vehicle in front of the vehicle is absent, it is considered that the driver wants to change the vehicle speed and operates the pedal. Therefore, in this case, the set vehicle speed is updated and it is possible to perform the setting process according to the sense of the driver.

According to another aspect of the invention, there is provided a vehicle running control device that controls the speed of a vehicle on the basis of information of a set inter-vehicle distance or a set vehicle speed according to the detection state of a vehicle in front. When an accelerator pedal or a brake pedal of the vehicle is operated and the vehicle in front of the vehicle is present, the set information of an object to be updated is selected on the basis of the magnitude relationship between the current speed of the vehicle and the set vehicle speed.

In the vehicle running control device, as information used to control the speed of the vehicle, an inter-vehicle distance and a vehicle speed are set in advance. When the accelerator pedal or the brake pedal of the vehicle is operated and the vehicle in front of the vehicle is present, it is considered that the traveling state of the vehicle desired by the driver can be discriminated on the basis of whether the current speed of the vehicle is higher or lower than the set vehicle speed by the pedal operation of the driver. Therefore, when the set information of the object to be updated is selected on the basis of whether the current speed of the vehicle is higher or lower than the set vehicle speed, it is possible to perform the setting process according to the sense of the driver.

In this case, when the pedal is operated, the vehicle in front is present, and the current vehicle speed is higher than the set vehicle speed, the set inter-vehicle distance and the set vehicle speed may be updated. When the current vehicle speed is higher than the set vehicle speed due to the pedal operation of the driver, it is considered that the driver wants to change the inter-vehicle distance and the vehicle speed and operates the pedal. Therefore, in this case, the set inter-vehicle distance and the set vehicle speed are updated and it is possible to perform the setting process according to the sense of the driver.

When the pedal is operated, the vehicle in front is present, and the current vehicle speed is equal to or lower than the set vehicle speed, only the set inter-vehicle distance may be updated. When the driver operates the pedal and the current vehicle speed is equal to or lower than the set vehicle speed, it is considered that the driver wants to change the inter-vehicle distance and operates the pedal operation, but does not particularly want to change the vehicle speed. Therefore, in this case, only the set inter-vehicle distance is updated and it is possible to perform the setting process according to the sense of the driver.

When the pedal is operated and the vehicle in front is present, the set inter-vehicle distance may be updated only when the time for which the same vehicle in front is present is equal to or longer than a predetermined time. When the time for which the same vehicle in front is present is less than the predetermined time, it is considered that the driver has no intent to maintain the distance between the vehicle and the vehicle in front and does not want to update the set inter-vehicle distance. Therefore, in this case, the set inter-vehicle distance is not updated and it is possible to perform the setting process according to the sense of the driver.

Advantageous Effects of Invention

According to the vehicle running control device of the invention, it is possible to set the vehicle running control information according to the sense of the driver.

REFERENCE SIGNS LIST 1, 201: VEHICLE RUNNING CONTROL DEVICE
12a: ACCELERATOR PEDAL
13a: BRAKE PEDAL
31, 231: VEHICLE-IN-FRONT DETERMINING UNIT
33: RUNNING CONTROL UNIT
34: SETTING CONTROL UNIT
35: SETTING STORAGE UNIT
237: DETERMINATION INFORMATION STORAGE UNIT
M0: SUBJECT VEHICLE
M1 TO M4: VEHICLE IN FRONT

DESCRIPTION OF EMBODIMENTS

Hereinafter, inter-vehicle running control devices according to exemplary embodiments of the invention will be described with reference to the accompanying drawings. In the following embodiments, the inter-vehicle running control device according to the invention is applied to all vehicle speed ACC [Adaptive Cruise Control] devices provided in the vehicles.

(First Embodiment)

Figure 1:
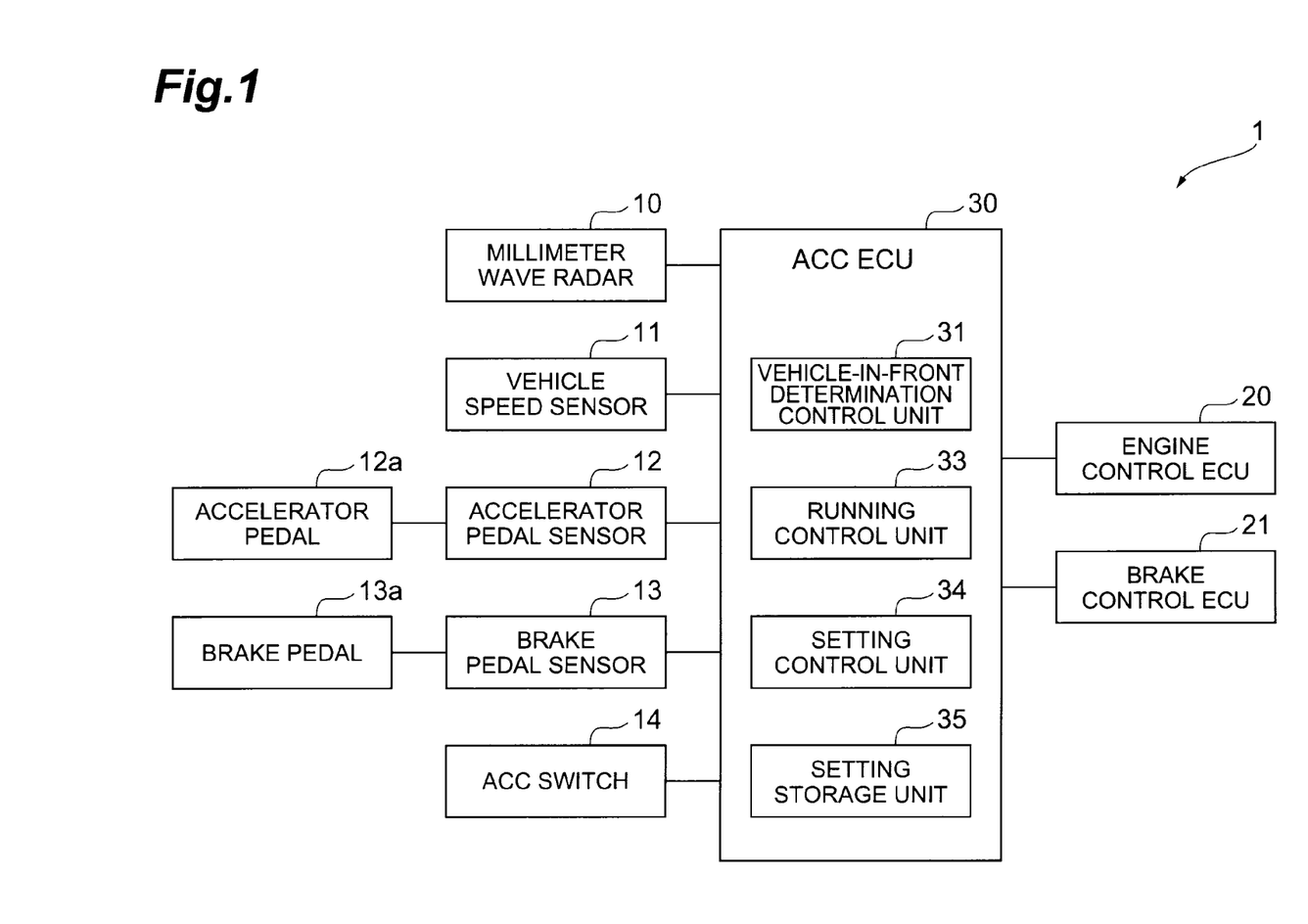
FIG. 1 is a block diagram illustrating the structure of an ACC device of a vehicle running control device according to a first embodiment of the invention.

In an ACC device 1 shown in FIG. 1, when there is a vehicle ahead of a subject vehicle, following control of the vehicle in front is performed such that the time between the subject vehicle and the vehicle in front is equal to a set inter-vehicle time. When there is no vehicle in front, constant speed control is performed such that the speed of the subject vehicle is equal to a set vehicle speed. However, in the following control of the vehicle in front, priority is given to a case in which the speed of the subject vehicle is equal to or less than the set vehicle speed. That is, when the vehicle speed for maintaining the time between the subject vehicle and the vehicle in front to be equal to the set inter-vehicle time is more than the set vehicle speed, the constant speed control is performed.

The ACC device 1 includes a millimeter wave radar 10, a vehicle speed sensor 11, an accelerator pedal sensor 12, a brake pedal sensor 13, an ACC switch 14, an engine control ECU [Electronic Control Unit] 20, a brake control ECU 21, and an ACC ECU 30.

The millimeter wave radar 10 is for detecting an object using millimeter waves. The millimeter wave radar 10 is attached to the center of the front side of the subject vehicle. The millimeter wave radar 10 transmits millimeter waves from the subject vehicle to the front side while scanning the horizontal plane with the millimeter waves and receives reflected millimeter waves. Then, the millimeter wave radar 10 transmits the transmission/reception information of the millimeter waves as a radar signal to the ACC ECU 30. The millimeter wave radar 10 can detect a vehicle in front that travels ahead of the subject vehicle. In this case, the ACC ECU 30 can detect the distance between the subject vehicle and the vehicle in front on the basis of the radar signal.

The vehicle speed sensor 11 is a wheel speed sensor that detects the rotational speed of the wheels. The vehicle speed sensor 11 transmits the rotational speed as a vehicle speed signal to, for example, the ACC ECU 30. The ACC ECU 30 calculates the speed of the subject vehicle from the rotational speed of the wheels. The ACC ECU 30 calculates acceleration or deceleration from a variation in the speed of the subject vehicle over time. The acceleration (deceleration) may be detected by an acceleration sensor.

The accelerator pedal sensor 12 detects the amount of depression (the degree of opening of the accelerator) of an accelerator pedal 12a. The accelerator pedal sensor 12 transmits the detected amount of depression as an accelerator pedal signal to, for example, the ACC ECU 30.

The brake pedal sensor 13 detects the amount of depression of a brake pedal 13a. The brake pedal sensor 13 transmits the detected amount of depression as a brake pedal signal to, for example, the ACC ECU 30.

The ACC switch 14 is for performing, for example, an operation of turning on (starting) or off (stopping) the ACC device 1. The ACC switch 14 transmits operation information input by the driver as an ACC switch signal to the ACC ECU 30.

The engine control ECU 20 is a control device that controls an engine (furthermore, driving force). The engine control ECU 20 sets target acceleration on the basis of, for example, an accelerator operation of the driver. The engine control ECU 20 sets a target degree of opening of a throttle valve required to obtain the target acceleration and transmits the target degree of opening as a target throttle opening degree signal to a throttle actuator (not shown). When receiving an engine control signal from the ACC ECU 30, the engine control ECU 20 transmits the target throttle opening degree signal required to obtain the target acceleration indicated by the engine control signal to the throttle actuator.

The throttle actuator adjusts the degree of opening of the throttle valve (not shown). The throttle actuator is operated in response to the target throttle opening degree signal from the engine control ECU 20 and adjusts the degree of opening of the throttle valve. When the degree of opening of the throttle value reaches a target value, the vehicle is accelerated to a target speed set by the engine control ECU 20 and a target vehicle speed is obtained.

The brake control ECU 21 is a control device that controls each brake (furthermore, braking force). The brake control ECU 21 sets target deceleration on the basis of, for example, a brake operation of the driver. The brake control ECU 21 sets the brake oil pressure of the wheel cylinder (not shown) of each wheel required to obtain the target deceleration and transmits the brake oil pressure as a target oil pressure signal to a brake actuator (not shown). In particular, when receiving a brake control signal from the ACC ECU 30, the brake control ECU 21 transmits the target oil pressure signal for obtaining the target deceleration indicated by the brake control signal to the brake actuator.

The brake actuator adjusts the brake oil pressure of the wheel cylinder of each wheel. The brake actuator is operated in response to the target oil pressure signal from the brake control ECU 21 and adjusts the brake oil pressure of the wheel cylinder. When the oil pressure reaches a target value, the vehicle is decelerated to a target speed by the brake control ECU 21 and a target vehicle speed is obtained.

The ACC ECU 30 is an electronic control unit including, for example, a CPU [Central Processing Unit], a ROM [Read Only Memory], and a RAM [Random Access Memory] and controls the overall operation of the ACC device 1. The ACC ECU 30 starts the ACC device 1 when the driver turns on the ACC switch 14 and stops the ACC device 1 when the driver turns off the ACC switch 14 during the operation of the ACC device 1, on the basis of an ACC switch signal from the ACC switch 14.

During the operation of the ACC device 1, the ACC ECU 30 receives various kinds of signals from various kinds of sensors 10, 11, 12, and 13, and performs, for example, vehicle-in-front determination control, following control of the vehicle in front, constant speed control, and setting control on the basis of the various kinds of signals. That is, the ACC ECU 30 includes a vehicle-in-front determination control unit 31 that performs vehicle-in-front determination control for determining whether there is a vehicle in front, a running control unit 33 that selectively performs following control of the vehicle in front and constant speed control, a setting storage unit 35 that stores set information required for the following control of the vehicle in front and the constant speed control, and a setting control unit 34 that performs, for example, a process of recording the set information stored in the setting storage unit 35. The vehicle-in-front determination control unit 31, the running control unit 33, the setting control unit 34, and the setting storage unit 35 are components which are implemented by software with the cooperation of hardware components, such as the CPU, the RAM, and the ROM of the ACC ECU 30, according to a predetermined program.

The vehicle-in-front determination control performed by the vehicle-in-front determination control unit 31 will be described below. The vehicle-in-front determination control unit 31 determines whether there is a vehicle (vehicle in front) that is traveling ahead of the subject vehicle on the basis of the radar signal from the millimeter wave radar 10 at a predetermined time interval. In this case, the vehicle-in-front determination control unit 31 estimates the traveling direction of the subject vehicle from, for example, a steering angle and a yaw rate and determines whether there is a vehicle in front considering the traveling direction of the subject vehicle. When there is a vehicle in front, the vehicle-in-front determination control unit 31 calculates the time between the subject vehicle and the vehicle in front from the speed of the subject vehicle detected by the vehicle speed sensor 11 and the distance between the subject vehicle and the vehicle in front detected by the radar signal from the millimeter wave radar 10 at a predetermined time interval.

The running control performed by the running control unit 33 will be described below. The running control unit 33 sets target acceleration/deceleration and transmits a control signal to the engine control ECU 20 and the brake control ECU 21 on the basis of the target acceleration or the target deceleration. The target acceleration/deceleration is represented by a positive value or a negative value. When the target acceleration/deceleration is a positive value, acceleration control (driving force control) by target acceleration is performed. When the target acceleration/deceleration is a negative value, deceleration control (braking force control) according to the target deceleration is performed.

The following control of the vehicle in front performed by the running control unit 33 will be described below. When there is a vehicle in front, the running control unit 33 reads a set inter-vehicle time from the setting storage unit 35 at a predetermined time interval and uses the set inter-vehicle time as a target inter-vehicle time. The running control unit 33 sets the target acceleration/deceleration required to make the time between the subject vehicle and the vehicle in front equal to the target inter-vehicle time at a predetermined time interval, on the basis of the difference between the time between the subject vehicle and the vehicle in front and the target inter-vehicle time. When the target acceleration/deceleration is a positive value, the running control unit 33 sets target acceleration and transmits the target acceleration as an engine control signal to the engine control ECU 20. When the target acceleration/deceleration is a negative value, the running control unit 33 sets target deceleration and transmits the target deceleration as a brake control signal to the brake control ECU 21.

As described above, the set inter-vehicle time indicating the target inter-vehicle time in the following control of the vehicle in front is stored in the setting storage unit 35. The set inter-vehicle time is automatically updated in response to the operation of the accelerator pedal 12a by the driver under predetermined conditions and is then overwritten to the setting storage unit 35, which will be described below. The set inter-vehicle time immediately after the ACC device 1 starts, for example, may be set by the driver using the function of the ACC switch 14 or it may be the inter vehicle time set when the ACC device 1 starts.

The constant speed control performed by the running control unit 33 will be described below. When there is no vehicle in front, the running control unit 33 reads the set vehicle speed from the setting storage unit 35 at a predetermined time interval and uses the set vehicle speed as a target vehicle speed. The running control unit 33 sets the target acceleration/deceleration required to make the subject vehicle speed equal to the target vehicle speed on the basis of the difference between the speed of the subject vehicle and the target vehicle speed. When the target acceleration/deceleration is a positive value, the running control unit 33 sets the target acceleration and transmits the target acceleration as an engine control signal to the engine control ECU 20. When the target acceleration/deceleration is a negative value, the running control unit 33 sets the target deceleration and transmits the target deceleration as a brake control signal to the brake control ECU 21.

As described above, the set vehicle speed indicating the target vehicle speed in the constant speed control is stored in the setting storage unit 35. The set vehicle speed is automatically updated in response to the operation of the accelerator pedal 12a by the driver under predetermined conditions and is then overwritten to the setting storage unit 35, which will be described below. The set vehicle speed immediately after the ACC device 1 starts, for example, may be set by the driver using the function of the ACC switch 14 or it may be the vehicle speed set when the ACC device 1 starts.

Next, the update control of the set inter-vehicle time and the update control of the set vehicle speed by the ACC ECU 30 during the operation of the ACC device 1 will be described with reference to FIG. 2. The set inter-vehicle time and the set vehicle speed are updated by the operation of the accelerator pedal 12a by the driver on the basis of predetermined conditions.

Figure 2:
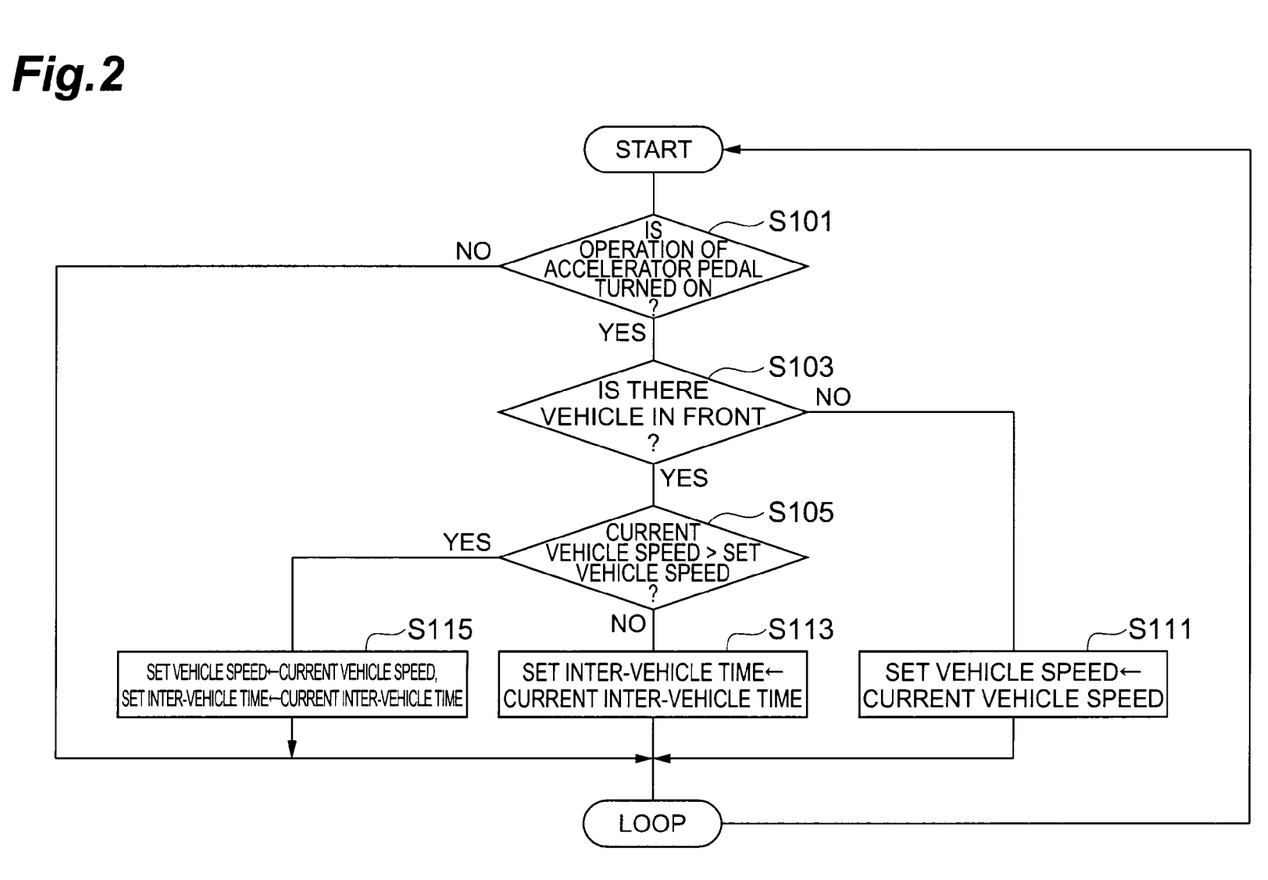
FIG. 2 is a flowchart illustrating the update control of a set vehicle speed and a set inter-vehicle time by the ACC device shown in FIG. 1.

During the operation of the ACC device 1, as shown in FIG. 2, no process is performed until it is detected that the operation of the accelerator pedal 12a is turned on (No in S101). When it is detected that the operation of the accelerator pedal 12a is turned on (Yes in S101), first, the vehicle-in-front determination control unit 31 determines whether there is a vehicle in front (S103). In this case, the accelerator pedal sensor 12 may detect whether the operation of the accelerator pedal 12a by the driver is turned on or off. While the operation of the accelerator pedal 12a is maintained in an on state, a process including Step S101, Step S103, and the subsequent steps is repeatedly performed.

When it is determined that there is no vehicle in front (No in S103), the setting control unit 34 acquires the current subject vehicle speed detected by the vehicle speed sensor 11 and overwrites the current subject vehicle speed as a new set vehicle speed to the setting storage unit 35 (S111; the update of the set vehicle speed). In Step S111, the update of the set inter-vehicle time is not performed. As described above, until the operation of the accelerator pedal 12a is turned off, Steps S103 and S111 are repeatedly performed as long as a vehicle in front appears. Therefore, the set vehicle speed is repeatedly updated. Finally, the speed of the subject vehicle becomes the latest set vehicle speed at the time when the operation of the accelerator pedal 12a is turned off.

In Step S103, when it is determined that there is a vehicle in front (Yes in S103), the setting control unit 34 acquires the current subject vehicle speed detected by the vehicle speed sensor 11, reads the set vehicle speed from the setting storage unit 35, and compares the current subject vehicle speed with the set vehicle speed (S105). When the current subject vehicle speed is higher than the set vehicle speed (Yes in S105), the setting control unit 34 overwrites the current subject vehicle speed as a new set vehicle speed to the setting storage unit 35 (S115; the update of the set vehicle speed). In this case, the setting control unit 34 acquires the current inter-vehicle time calculated by the vehicle-in-front determination control unit 31 and overwrites the current inter-vehicle time as a new set inter-vehicle time to the setting storage unit 35 (S115; the update of the set inter-vehicle time). As described above, until the operation of the accelerator pedal 12a is turned off, Steps S103, S105, and S115 are repeatedly performed as long as there is a vehicle in front. Therefore, the set vehicle speed and the set inter-vehicle time are repeatedly updated. Finally, the subject vehicle speed and the inter-vehicle time respectively become the latest set vehicle speed and the latest set inter-vehicle time at the time when the operation of the accelerator pedal 12a is turned off.

In Step S105, when the current subject vehicle speed is equal to or less than the set vehicle speed (No in S105), the setting control unit 34 acquires the current inter-vehicle time calculated by the vehicle-in-front determination control unit 31 and overwrites the current inter-vehicle time as a new set inter-vehicle time to the setting storage unit 35 (S113; the update of the set inter-vehicle time). In Step S113, the set vehicle speed is not updated. As described above, until the operation of the accelerator pedal 12a is turned off, Steps S103, S105, and S113 are repeatedly performed as long as there is a vehicle in front and the current subject vehicle speed is not higher than the set vehicle speed. Therefore, the set inter-vehicle time is repeatedly updated. Finally, the inter-vehicle time becomes the latest set inter-vehicle time at the time when the operation of the accelerator pedal 12a is turned off.

The above-mentioned series of processes is repeatedly performed during the operation of the ACC device 1.

Next, the operation and effect of the ACC device 1 performing the above-mentioned process will be described.

Finally, Step S111 is performed when there is no vehicle in front immediately before the operation of the accelerator pedal 12a ends. As such, when there is no vehicle in front and the accelerator pedal 12a is operated to accelerate the vehicle, it is considered that the driver wants to increase the set vehicle speed in the constant speed control and depresses the accelerator pedal 12a. If the set vehicle speed is not updated, the vehicle speed increased by the operation of the accelerator pedal 12a returns to the original vehicle speed and the vehicle speed desired by the driver is not obtained. It is considered that, since there is no vehicle in front, the driver does not want to change the setting of the inter-vehicle time. Therefore, in Step S111, only the set vehicle speed is updated and the set inter-vehicle time is maintained. In this way, the driver can set the vehicle speed and the inter-vehicle time according to the sense of the driver.

In this case, the vehicle speed when the driver depresses the accelerator pedal 12a to increase the vehicle speed and takes his or her foot off the accelerator pedal 12a after the vehicle speed reaches a desired vehicle speed may be used as the set vehicle speed. As such, the driver can intuitively set the vehicle speed, which is a setting item of ACC.

Step S113 is finally performed when a vehicle in front is present immediately before the operation of the accelerator pedal 12a ends and the speed of the subject vehicle is not higher than the set vehicle speed. As such, when a vehicle in front is present, the accelerator pedal 12a is operated to accelerate the vehicle, and the speed of the subject vehicle is not higher than the set vehicle speed, it is considered that the driver wants to reduce the time between the subject vehicle and the vehicle in front and depresses the accelerator pedal 12a. In addition, it is considered that, after the distance between the subject vehicle and the vehicle in front is reduced, the driver wants to continuously follow the vehicle in front. If the set inter-vehicle time is not updated, the inter-vehicle distance reduced by the operation of the accelerator pedal 12a returns to the original value and the inter-vehicle distance desired by the driver is not obtained. If the set vehicle speed is updated to the current subject vehicle speed, the upper limit (set vehicle speed) of the speed of the subject vehicle for following the vehicle in front is reduced. In this case, it may be difficult to follow the vehicle in front and the inter-vehicle distance desired by the driver is not obtained. Therefore, in Step S113, only the set inter-vehicle time is updated and the set vehicle speed is maintained. In this way, the driver can set the vehicle speed and the inter-vehicle time according to the sense of the driver.

In this case, the inter-vehicle time when the driver depresses the accelerator pedal 12a to reduce the distance between the subject vehicle and the vehicle in front and takes his or her foot off the accelerator pedal 12a after the inter-vehicle distance reaches a desired value may be used as the set inter-vehicle time. As such, the driver can intuitively set the inter-vehicle time, which is a setting item of ACC.

Step S115 is finally performed when a vehicle in front is present immediately before the operation of the accelerator pedal 12a ends and the speed of the subject vehicle is higher than the set vehicle speed. As such, when a vehicle in front is present, the accelerator pedal 12a is operated to accelerate the vehicle, and the speed of the subject vehicle is higher than the set vehicle speed, it is considered that the driver wants to reduce the distance between the subject vehicle and the vehicle in front and wants to continuously follow the vehicle in front after the distance between the subject vehicle and the vehicle in front is reduced. If the set inter-vehicle time is not updated, the inter-vehicle distance reduced by the operation of the accelerator pedal 12a returns to the original value and the inter-vehicle distance desired by the driver is not obtained. If the set vehicle speed is not updated, the speed of the subject vehicle is reduced to the set speed after the operation of the accelerator pedal 12a ends. Therefore, the upper limit (set vehicle speed) of the speed of the subject vehicle for following the vehicle in front is reduced. In this case, it may be difficult to follow the vehicle in front and the inter-vehicle distance desired by the driver is not obtained. Therefore, in Step S113, both the set inter-vehicle time and the set vehicle speed are updated. In this way, the driver can set the vehicle speed and the inter-vehicle time according to the sense of the driver.

The speed of the subject vehicle when the driver depresses the accelerator pedal 12a to reduce the distance between the subject vehicle and the vehicle in front and takes his or her foot off the accelerator pedal 12a after the inter-vehicle distance and the vehicle speed reach desired values may be used as the set vehicle speed and the inter-vehicle time when the driver takes his or her foot off the accelerator pedal 12a may be used as the set inter-vehicle time. As such, the driver can intuitively set the inter-vehicle time, which is a setting item of ACC.

As described above, according to the ACC device 1, the driver can intuitively set the inter-vehicle time and the vehicle speed without a complicated operation, such as a lever operation or a button operation.

(Second Embodiment)

Figure 3:
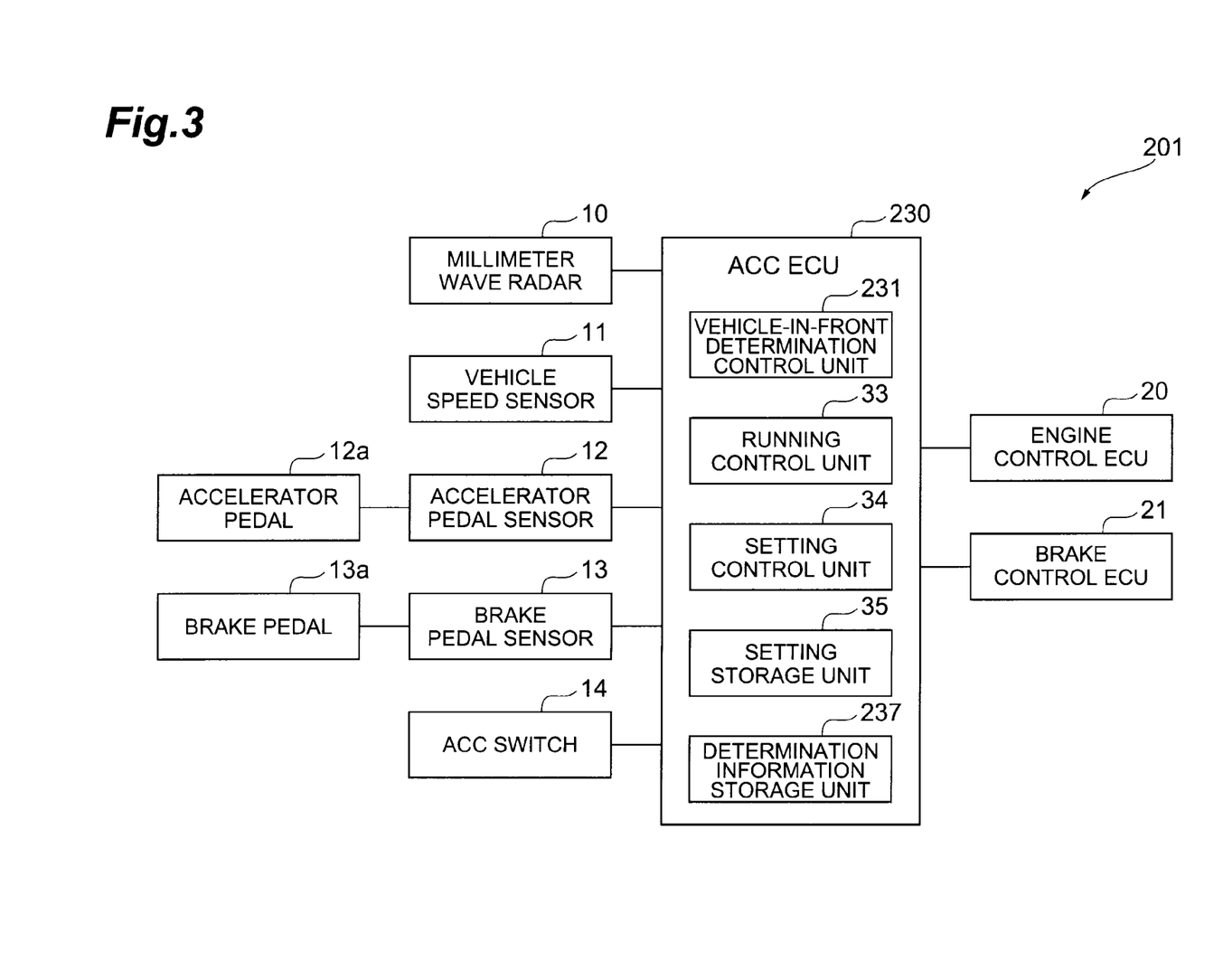
FIG. 3 is a block diagram illustrating the structure of an ACC device of a vehicle running control device according to a second embodiment of the invention.

As shown in FIG. 3, an ACC ECU 230 of an ACC device 201 includes a vehicle-in-front determination control unit 231 and a determination information storage unit 237. In the ACC device 201, the same or equivalent components as those in the ACC device 1 according to the first embodiment are denoted by the same reference numerals and a detailed description thereof will be omitted.

The vehicle-in-front determination control unit 231 performs the following vehicle-in-front determination control. The vehicle-in-front determination control unit 231 continuously monitors a vehicle in front that has been detected ahead of the subject vehicle for the past 5 seconds on the basis of a radar signal from a millimeter wave radar 10 and determines whether the same vehicle in front has been continuously present ahead of the subject vehicle for the past 5 seconds. That is, when the vehicle detected as a vehicle in front ahead of the subject vehicle has changed, rapidly appeared, or become absent within past 5 seconds, it is determined not to be the case that "the same vehicle in front has been continuously present for the past 5 seconds".

Figure 4:
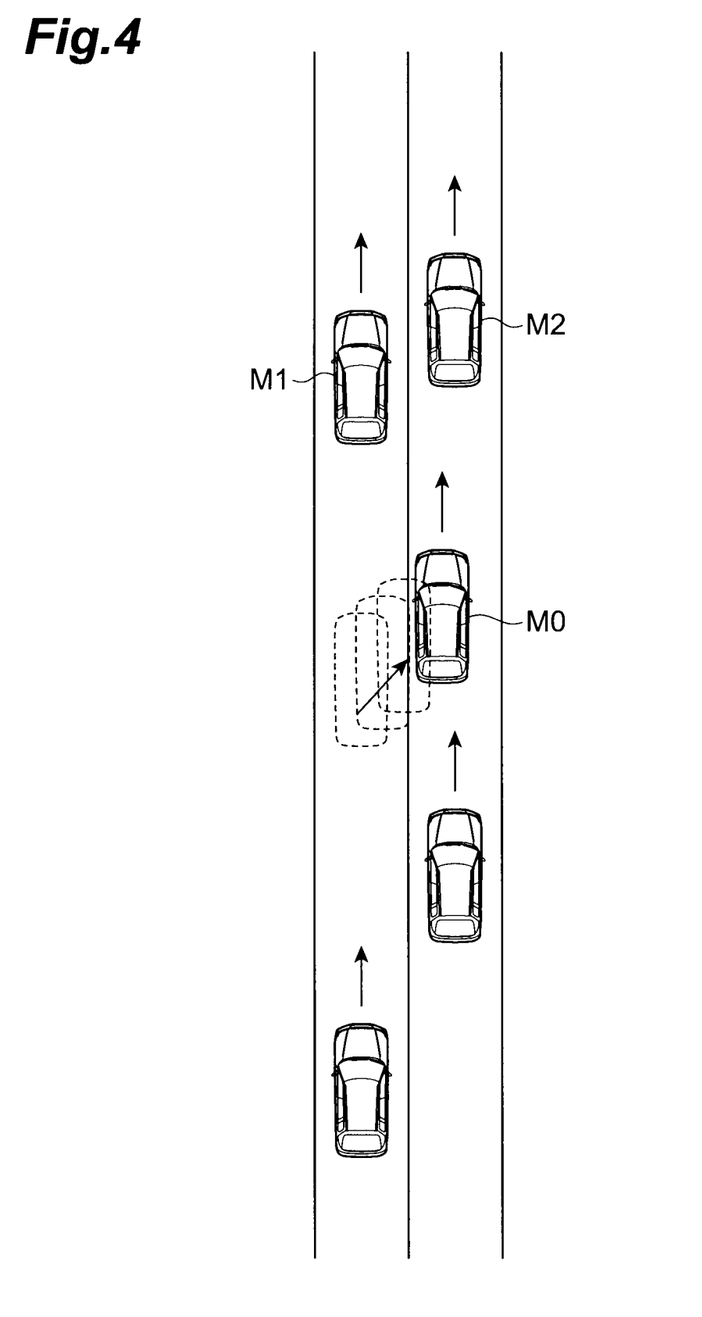
FIG. 4 is a diagram illustrating an example of a situation in which the time for which the same vehicle in front is present is less than a predetermined time.
Figure 5:
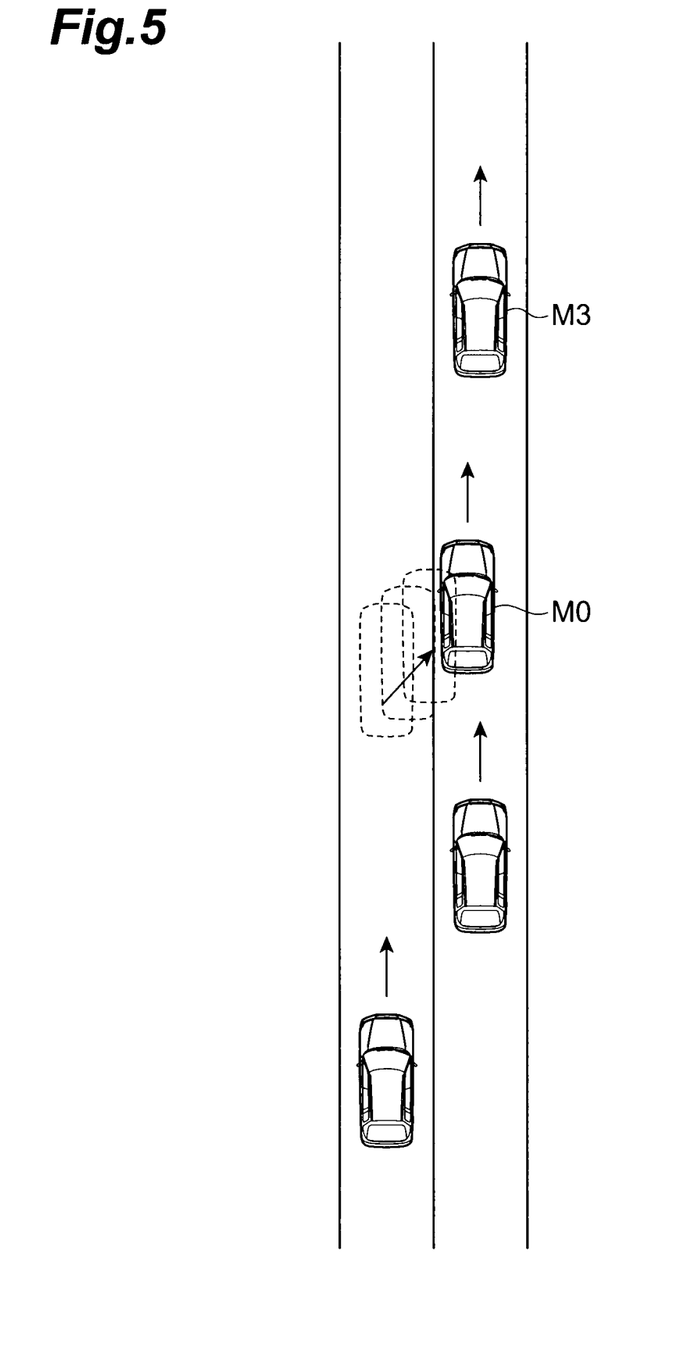
FIG. 5 is a diagram illustrating another example of the situation in which the time for which the same vehicle in front is present is less than the predetermined time.
Figure 6:
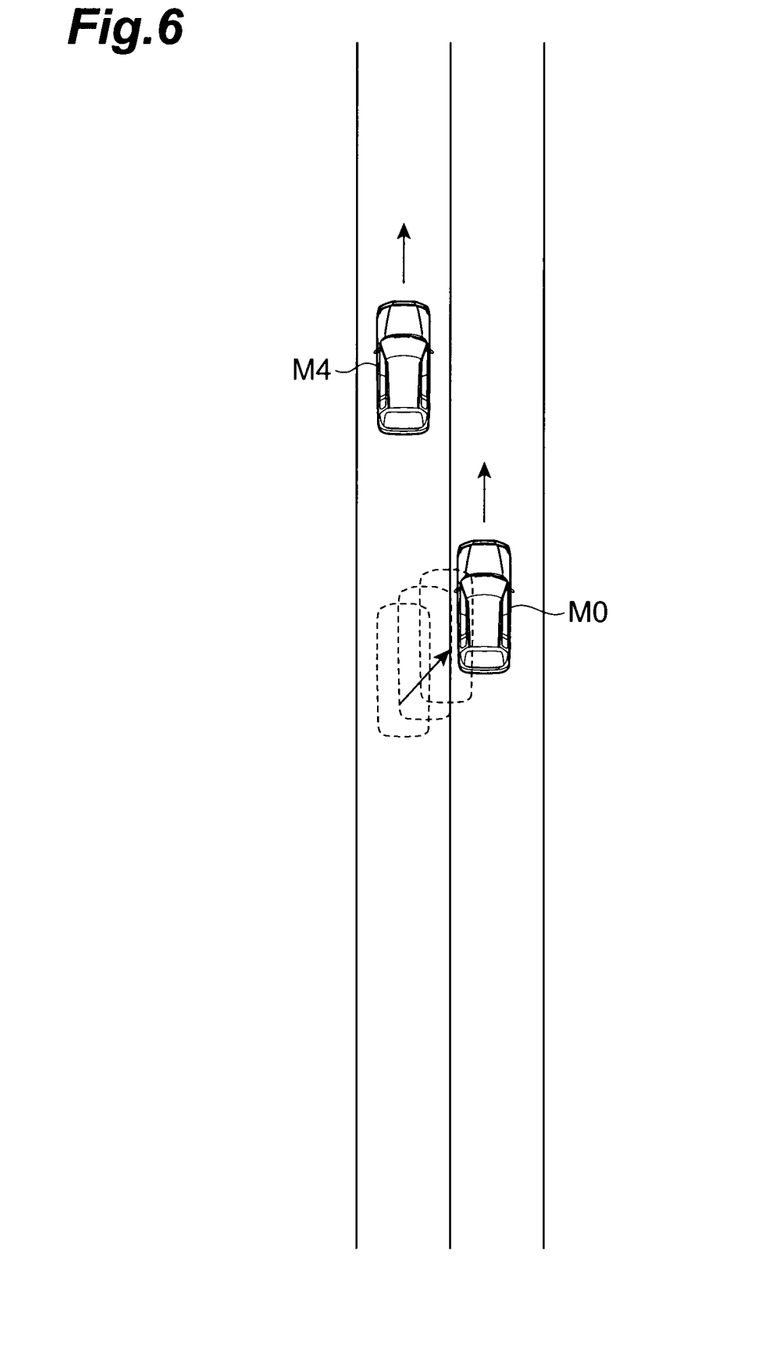
FIG. 6 is a diagram illustrating still another example of the situation in which the time for which the same vehicle in front is present is less than the predetermined time.

For example, as shown in FIG. 4, when a subject vehicle M0 has changed its lane from a left lane to a right lane within the past 5 seconds, a vehicle in front detected by the subject vehicle M0 is changed from a vehicle M1 to a vehicle M2. In this case, it is determined not to be the case that "the same vehicle in front has been continuously present for the past 5 seconds". For example, as shown in FIG. 5, when the subject vehicle M0 that has not detected a vehicle in front has changed its lane within the past 5 seconds and detected a vehicle M3 in front, it is determined not to be the case that "the same vehicle in front has been continuously present for the past 5 seconds". For example, as shown in FIG. 6, when the subject vehicle M0 that has detected a vehicle M4 in front has changed its lane within the past 5 seconds and has not detected a vehicle in front, it is determined not to be the case that "the same vehicle in front has been continuously present for the past 5 seconds".

For example, when the subject vehicle detects a vehicle in front and both the subject vehicle and the vehicle in front do not change their lanes for 5 seconds or more, it is determined that "the same vehicle in front has been continuously present for the past 5 seconds". Determination information indicating the determination result is periodically repeatedly recorded on a determination information storage unit 237 during the operation of the ACC device 201. In this embodiment, "5 seconds" is set as the number of seconds at which the vehicle in front is stably detected for a predetermined period of time. However, a period of more or less than 5 seconds may be set.

The update control of the set inter-vehicle time and the update control of the set vehicle speed performed by the ACC ECU 230 during the operation of the ACC device 201 will be described with reference to FIG. 7.

Figure 7:
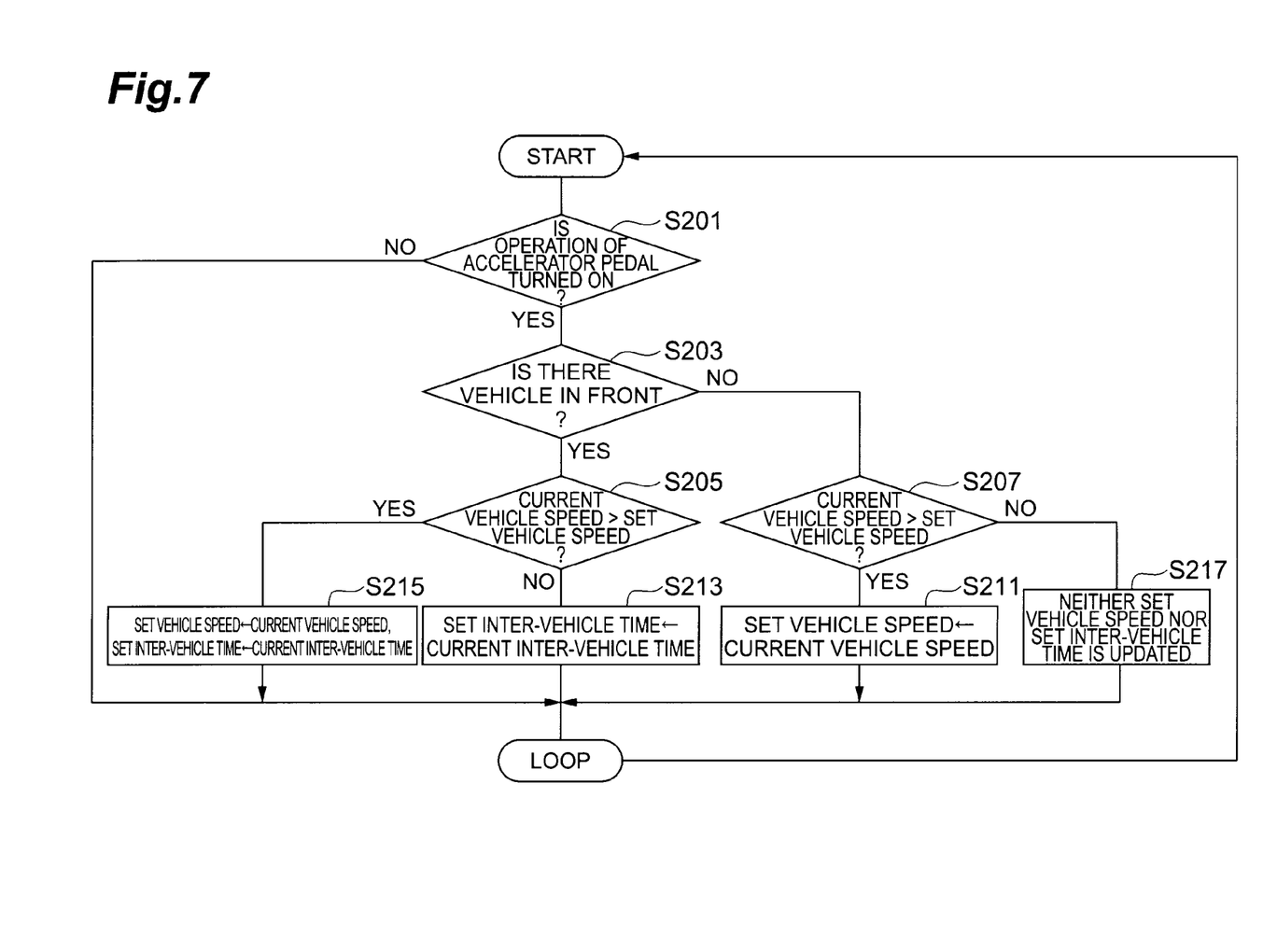
FIG. 7 is a flowchart illustrating the update control of a set vehicle speed and a set inter-vehicle time by the ACC device shown in FIG. 3.

During the operation of the ACC device 201, as shown in FIG. 7, no process is performed until a change in the operation of the accelerator pedal 12a from an on state to an off state is detected (No in S201). When the change in the operation of the accelerator pedal 12a from the on state to the off state is detected (Yes in S201), first, the setting control unit 34 determines whether "the same vehicle in front has been continuously present for the past 5 seconds" with reference to the determination information storage unit 237 (S203).

When it is determined that the same vehicle in front has not been continuously present for the past 5 seconds (No in S203), the setting control unit 34 compares the current subject vehicle speed with the set vehicle speed (S207). The comparison process in Step S207 is the same as that in Step S105 (see FIG. 2). In the comparison between the speeds, when the current subject vehicle speed is higher than the set vehicle speed (Yes in S207), the same update process of the set vehicle speed as that in Step S111 (see FIG. 2) is performed (S211). In the comparison between the speeds in Step S207, when the current subject vehicle speed is equal to or lower than the set vehicle speed (No in S207), no set information is updated, and the set vehicle speed and the set inter-vehicle time are maintained (S217).

When it is determined in Step S203 that the same vehicle in front has been continuously present for the past 5 seconds (Yes in S203), the current subject vehicle speed is compared with the set vehicle speed (S205). The comparison process in Step S205 is the same as that in Step S105 (see FIG. 2). When the current subject vehicle speed is higher than the set vehicle speed (Yes in S205), the setting control unit 34 updates the set vehicle speed and the set inter-vehicle time, similar to Step S115 (see FIG. 2) (S215). In Step S205, when the current subject vehicle speed is equal to or lower than the set vehicle speed (No in S205), the setting control unit 34 updates the set inter-vehicle time, similar to Step S113 (see FIG. 2) (S213). The above-mentioned series of processes is repeatedly performed during the operation of the ACC device 1.

Next, the operation and effect of the ACC device 201 performing the above-mentioned process will be described.

The difference between the process of the ACC device 201 (see FIG. 7) and the process of the ACC device 1 (see FIG. 2) is as follows. That is, the difference is that, when a vehicle in front is present immediately after the operation of the accelerator pedal 12a ends, but the same vehicle in front has not been continuously present for the past 5 seconds, the process of updating the set inter-vehicle time is not performed (S203).

For example, in the situation shown in FIG. 4, it is considered that the accelerator pedal 12a of the subject vehicle M0 is operated in order to follow the speed of the vehicles including the vehicle M2 in the right lane. Therefore, it is considered that, even when the time between the subject vehicle M0 and the vehicle M2 in front is shorter than the set inter-vehicle time at the time when the operation of the accelerator pedal 12a ends after a lane change, the reduced inter-vehicle time is not desired by the driver of the subject vehicle M0. For example, in the situation shown in FIG. 5, it is considered that the time between the subject vehicle and the vehicle M3 in front when the operation of the accelerator pedal 12a ends is not equal to a desired inter-vehicle time set by the driver of the subject vehicle M0. Therefore, in this case, the set inter-vehicle time is not updated and it is possible to exclude a setting process that is not suitable for the sense of the driver.

In the situations shown in FIGS. 4 and 5, it is considered that the driver of the subject vehicle M0 wants to perform the following control of the vehicle in front on each of the vehicles M2 and M3 in front after the operation of the accelerator pedal 12a ends. In the situations shown in FIGS. 4 and 5, when the speed of the subject vehicle is equal to or lower than the set vehicle speed at the time when the operation of the accelerator pedal 12a ends and the set vehicle speed is updated to the current subject vehicle speed, the upper limit (set vehicle speed) of the speed of the subject vehicle for following the vehicles M2 and M3 in front is reduced. In this case, it may be difficult to follow the vehicles M2 and M3 in front, and following control desired by the driver is not obtained. Therefore, in Step S207, when the speed of the subject vehicle is equal or lower than the set vehicle speed, the set vehicle speed is also maintained at the current value (S217) and it is possible to exclude a setting process that is not suitable for the sense of the driver.

The ACC device 201 differs from the ACC device 1 in that steps after Steps S203 are performed when the operation of the accelerator pedal 12a ends (S201). Similar to the ACC device 1, when steps after Step S203 are repeatedly performed while the operation of the accelerator pedal 12a is in an on state, the set inter-vehicle time or the set vehicle speed is updated immediately after the lane is changed to detect the vehicle M1 in front in the situation shown in FIG. 4. The ACC device 201 performs the steps after Step S203 only once after the operation of the accelerator pedal 12a ends. In this way, it is possible to exclude an update process that is not desired by the driver.

The invention is not limited to the above-described first and second embodiments. In the first and second embodiments, the set inter-vehicle time is used as an index for quantitatively treating the distance between the subject vehicle and the vehicle in front. However, the inter-vehicle distance may be used as the index. A plurality of inter-vehicle distance maps in which the inter-vehicle distance and the speed of the subject vehicle are associated with each other may be prepared, and the inter-vehicle distance maps may be switched to update the set distance between the vehicle in front and the subject vehicle.

INDUSTRIAL APPLICABILITY

The invention relates to a vehicle running control device that controls the speed of a vehicle on the basis of the information of a set inter-vehicle distance or a set vehicle speed according to the detection state of a vehicle in front and can set the information of vehicle running control according to the sense of the driver.

The invention claimed is:

1. A vehicle running control device comprising:
a controller configured to control a speed of a vehicle on the basis of information of a set inter-vehicle distance or a set vehicle speed according to a detection state of a vehicle in front,
wherein, when an accelerator pedal or a brake pedal of the vehicle is operated and the vehicle in front of the vehicle is present, set information of an object to be updated is selected on the basis of magnitude relationship between a current speed of the vehicle and the set vehicle speed.

2. The vehicle running control device according to claim 1, wherein, when the accelerator pedal is operated, the vehicle in front is present, and the current vehicle speed is higher than the set vehicle speed, the set inter-vehicle distance is updated to a reduced inter-vehicle distance and the set vehicle speed is updated to the current speed of the vehicle.

3. The vehicle running control device according to claim 1, wherein, when the accelerator pedal is operated, the vehicle in front is present, and the current vehicle speed is equal to or lower than the set vehicle speed, only the set inter-vehicle distance is updated to a reduced inter-vehicle distance.

4. The vehicle running control device according to claim 1, wherein, when the pedal is operated and the vehicle in front is present, the set inter-vehicle distance is updated only when a time for which the same vehicle in front is present is equal to or longer than a predetermined time.

5. The vehicle running control device according to claim 1, wherein the object to be updated is at least one of the set inter-vehicle distance and the set vehicle speed.

6. The vehicle running control device according to claim 1, wherein the set vehicle speed is a speed at which the vehicle is set to maintain.

* * * * *